United States Patent
Eberlein et al.

(10) Patent No.: US 12,436,779 B2
(45) Date of Patent: Oct. 7, 2025

(54) INTERACTIVELY EXTENDING MACHINE-LEARNING-GENERATED RULES AND RECOMMENDATIONS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 460 days.

(21) Appl. No.: 18/048,578

(22) Filed: Oct. 21, 2022

(65) Prior Publication Data

US 2024/0134660 A1 Apr. 25, 2024
US 2024/0231848 A9 Jul. 11, 2024

(51) Int. Cl.
*G06F 9/445* (2018.01)
*G06F 16/248* (2019.01)
*H04L 9/40* (2022.01)

(52) U.S. Cl.
CPC ........ *G06F 9/44526* (2013.01); *G06F 16/248* (2019.01); *H04L 63/0227* (2013.01)

(58) Field of Classification Search
None
See application file for complete search history.

(56) References Cited

U.S. PATENT DOCUMENTS 7,716,517 B2 * 5/2010 Toeroe ............... G06F 11/1482
714/47.1
2022/0350820 A1 * 11/2022 Xie ....................... G06F 16/285

FOREIGN PATENT DOCUMENTS

WO   WO 2017214665   12/2017

OTHER PUBLICATIONS

Extended European Search Report in European Appln. No. 22208914. 6, mailed on Sep. 22, 2023, 8 pages.
Wikipedia.org [online], "Association rule learning" created on Apr. 2004, retrieved on Oct. 24, 2022, retrieved from URL <https://en.wikipedia.org/wiki/Association_rule_learning>, 16 pages.

* cited by examiner

*Primary Examiner* — Craig C Dorais
(74) *Attorney, Agent, or Firm* — Fish & Richardson P.C.

(57) ABSTRACT

In an implementation, one or more rules associated with a DO from a rules database is read by a rule user interface (UI) plug-in associated with a data object (DO) maintenance UI. The one or more rules for the DO to fields associated with the DO on the DO maintenance UI are related by the rule UI plug-in. The rule UI plug-in, using the related one or more rules, auto-populates and validates received values for the fields associated with the DO on the DO maintenance UI. The rule UI plug-in determines that one or more violations of the one or more rules has occurred and displays an additional UI with mutually exclusive options for mitigating the determined one or more violations of the one or more rules. A new rule is saved into the rules database.

20 Claims, 5 Drawing Sheets

FIG. 1

UI — Electronics Items Maintenance (216)

- Name: Axil AirPiods (202)
- Prod Family: Headphones (204)
- Prod Group: Cons. Electr. (206)
  - Auto-fill using rule "H-CR" (210)
- Price: 98,95 € (218)
- Unit: Each
- Weight: 40 g
- Insurance: Yes (212)
- Description: In-ear headphones with studio quality.

Rule Insurance1 violated → pop-up

Rules & Recommendations (216)

Rule for field "Insurance":
"Prod Family" = "Headphones" and Price "<" 99,96 €" then "Insurance" = "No"
How do you want to proceed
- [ ] Change to "No"
- [ ] Keep value as exception, apply no rules
- [ ] Change rule:
  "Prod Family" = "Headphones" and Price "<" 98,95 €" (edit value)
  then "Insurance" = "No", else "Insurance" = "Yes"

DB Table: "Electronic Items Extended", DO="EIE" (208)

| ID | Name | Prod Family | Prod Group | Unit | Price | Weight | Insurance |
|----|------|-------------|------------|------|-------|--------|-----------|
| 1 | IXI-Ear | Headphones | Cons. Electr. | Each | 9,95 € | 20 g | No |
| 2 | O-My-O-ear | Headphones | Cons. Electr. | Each | 129 € | 345 g | Yes |
| 3 | Speaker-cable Master-gold | El. Accessories | Cons. Electr. | meter | 2,99 € | 40 g | No |
| 4 | Lark super clean | Vacuums | Home Electr. | Each | 389 € | 4.1 kg | Yes |
| 5 | Basic AA rechargeable | Home Accessories | Home Electr. | 12-pack | 23,95 € | 360 g | No |

Rules (214)

| ID | DO | Rule | Target Field | Rule |
|----|----|------|--------------|------|
| 1 | EIE | H-CR | Prod Group | If ("Prod Family" == "Headphones") then ("Cons. Electr.") |
| 2 | EIE | E-CR | Prod Group | If ("Prod Family" == "El. Accessories") then ("Cons. Electr.") |
| 4 | EIE | H-U | Unit | If ("Prod Family" == "Headphones") then ("Each") |
| 5 | EIE | V-W | Weight | If ("Prod Family" == "Vacuums") then ("3.1 kg – 22 kg]") |
| 6 | EIE | HA-HE | Prod Group | If ("Prod Family" == "Home Accessories") then ("Home Electr.") |
| 7 | EIE | Insurance0 | Insurance | If ("Prod Family" == "El. Accessories") then "No" |
| 8 | EIE | Insurance1 | Insurance | If ("Prod Family" == "Headphones") { If ("Price < 99,96 €") then ("No") else ("Yes") } |
| 9 | EIE | Insurance2 | Insurance | If ("Prod Family" == "Vacuums") then ("Yes") |

INTERACTIVELY EXTENDING MACHINE-LEARNING-GENERATED RULES AND RECOMMENDATIONS

BACKGROUND

Software applications typically have a data model defined by developers. Within the data model, database foreign key relationships are defined by the developers, where the values in one column of one database table are constrained to a set of values defined in another database table. Additionally, certain value ranges or patterns are enforced by a maintenance user interface (UI). Such constraints are typically defined by the developers.

In some cases, software applications might be envisioned with a less-strict model persistency, such as for modern master data management systems, where an evolving set of rules defining constraints on content are needed. Such constraints can also be "soft constraints," where data relations are not strictly enforced, but exceptions might be acceptable. Data may also comply with constraints being specific for a user of the software application and change over time.

A developer could also envision a software application with a configurable set of relationships between fields and rules defining constraints on a set of values allowed for certain fields. However, usability of this software application might not be optimal, as regular users are required to consider the relationships and to configure the rules for application/enforcement.

Some data values and ranges can be very user-specific, and require a content-based configuration UI. However, other types of constraints might be dynamic and cannot be foreseen by a developer.

SUMMARY

The present disclosure describes determining and configuring rules defining data relations and constraints on data values, where the rules are automatically determined by a machine-learning (ML) system and extensible by a user.

In an implementation, one or more rules associated with a DO from a rules database is read by a rule user interface (UI) plug-in associated with a data object (DO) maintenance UI. The one or more rules for the DO to fields associated with the DO on the DO maintenance UI are related by the rule UI plug-in. The rule UI plug-in, using the related one or more rules, auto-populates and validates received values for the fields associated with the DO on the DO maintenance UI. The rule UI plug-in determines that one or more violations of the one or more rules has occurred and displays an additional UI with mutually exclusive options for mitigating the determined one or more violations of the one or more rules. A new rule is saved into the rules database.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, compared to current user interface (UI) functionality and UI input validation, the described approach allows adding ML-generated rules into a UI based on individual user data. Second, compared to an asynchronous batch data cleansing process, the described approach allows identification of deviations and anomalies made during data entry based on rules that were originally mined by ML and interactively extended during the data entry. Third, compared to the asynchronous batch data cleansing process, the described approach permits using a UI to add rules to identified relations between fields that have been manually entered by a user. Therefore, rules can be created more quickly. Additionally, rules are entered with "human intelligence" and not only ML; resulting in a more correct and elaborate rule system.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 2 is a block diagram illustrating an example validation range check using multiple input fields, according to an implementation of the present disclosure

Like reference numbers and designations in the various drawings indicate like elements.

DETAILED DESCRIPTION

The following detailed description describes determining and configuring rules defining data relations and constraints on data values, where the rules are automatically determined by a machine-learning (ML) system and extensible by a user, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Described is an approach for management of rules and recommendations for data input user interfaces (UIs) within software applications (also "applications" or "apps"). The approach permits adding rules for value recommendation and value constraint checks to a data maintenance user interface (UI). The rules are taken initially from a ML "rule mining" process (for example, as may be used for data cleansing purposes). In the use of a software application, the rules can be applied in data maintenance. If a rule finds a deviation of the entered data from the constraints defined by the rules, a user can modify or extend rules directly in the data maintenance UI. Extended rules are then added to the software application and are used for further data entry using the data maintenance UI or for asynchronous data cleansing without the need to repeat the ML process.

Software applications typically have a data model defined by developers. Within the data model, database foreign key relationships are defined by the developers, where the values in one column of one database table are constrained to a set of values defined in another database table. Additionally, certain value ranges (for example, only positive numbers) or patterns (for example, an e-mail address pattern) are enforced by a maintenance user interface (UI). Such constraints are typically defined by the developers.

In some cases, software applications might be envisioned with a less-strict model persistency, such as for modern master data management systems, where an evolving set of rules defining constraints on content are needed. Such constraints can also be "soft constraints," where data relations are not strictly enforced, but exceptions might be acceptable. Data may also comply with constraints being specific for a user of the software application and change over time.

A developer could also envision a software application with a configurable set of relationships between fields and rules defining constraints on a set of values allowed for certain fields. However, usability of this software application might not be optimal, as regular users are required to consider the relationships and to configure the rules for application/enforcement.

Some data values and ranges can be very user-specific, and require a content-based configuration UI. However, other types of constraints might be dynamic and cannot be foreseen by a developer.

ML-based "association rule learning" is a standard mechanism used to derive rules in data sets. Based on the ML analysis, relations between data fields can be determined. Note that the determined relations are based on actual data of an individual user(s) and are not only theoretical relations. Such determined relations can then be used to define an initial set of rules, enable a user to create additional rules not (yet) identified by ML, and even recommend meaningful rules.

There are various issues to overcome with respect to the described methodology. First, data fields and value constraints are not defined by the software application vendors but by users. Fields can be added to database tables by key-user extensibility tools or data can be stored in key-value pairs (non-relational). Input validations for such user defined fields are only provided generically and are hard to configure. Second, correlation of values between two data fields in a software application can be user-specific. Users can perform different actions in different scenarios and have different problems that need to be solved with a software application—resulting in different data distributions, data relations, and statistical distributions of values. As a result, a strict persistency model with pre-thought foreign key relationships and configurable constraints can hinder usage or make usage cumbersome. Third, modern methodologies such as ML, can be used to determine relations between fields and to discover rules, but the question is how to integrate this information into a software application. Data cleansing processes are defined using ML and "rule mining". Such processes find anomalies in data post-data maintenance and require an additional process to later clean the data. This results in a larger portion of data not matching the identified and desired constraints for extended periods of time. Such a process can create inefficiencies in data cleansing processes.

The approach is applied to a software application which uses ML to mine rules on data, transfer the ML-generated rules into recommendation and validation modules which can be applied to a UI during data maintenance. The approach supports a user by providing values compliant to rules to avoid a need for manual data correlation at a later time. Newly entered data is directly checked against the rules and invalid values are prevented because users are informed about deviations of data entries with respect to the rule base.

Since data evolves and rules might not be static in a usage scenario, the approach also allows the user to overrule rules and enter data which does not comply with historic rules—but which may then form new rules. The approach also permits the user to shortcut a data entering—rule mining—data cleansing process and to specify new rules on the UI when new data is entered which does not match existing rules. In certain cases, rules (or rule enhancements) can be recommended by the approach. This is particularly important if there are only very few instances of certain data combinations that would not provide sufficient support for a ML-generated rule, but if a user confirms an identified new rule, it can be activated immediately without the need for large quantities of learning data.

In typical implementations, ML-based "association rule learning" is used to identify relations between fields. Users can then only create new rules for these identified relations from an initial ML run, because the approach constrains the users to entering rules for fields which have relations according to the data of a group of users using the same data set (that is, the same application instance or deployment). This is to prevent non-applicable or inefficient rule proposals between unrelated fields.

For categorical-type data values, ML is run to identify relationships between values of one field to values of another field. Then ML can be used for "rule mining"—creating a rule specifying, which value in one field is valid for a certain value of another field. The approach permits storage of several such rules for every field on the UI (that is, constraining the combination of values in two fields). More than one rule can be defined for the same field and the rules have an associated attribute which allows ranking of the rules (that is, suggesting that one rule is more applicable than another).

In the described approach, the UI is extended to apply a rule during data maintenance and to provide support for a user. This can be accomplished, for example, by recommending values, checking validations defined by the rule, and providing the user a hint on how to change a value so that it is compliant with the rule. Alternatively, a user may consider to not comply with recommendations, validation checks, or hints, and to store the value as given.

In some cases, if entered data does not match a rule or violates a rule, the approach can offer a user an opportunity to define a new rule, which can then be stored and applied on the UI at the next call to the UI (by the same or another user). The approach is based on an evolving set of rules, which are not enforced but used to guide the user. Users can participate in implicitly defining rules as they enter new data.

For numerical-type data values, rule mining computes a "range of values" in a numeric field, related to values in another field (for example, categorical or numeric). If a value is entered, the rules are then applied. If the entered value is not within a defined value range, a user can decide to adjust the value, store the given value, or adjust the value range defined by the rule.

In some implementations, when a user interacts with the described approach by activating a maintenance UI for a data object, rules defined for fields of the data object are loaded. The user then enters data into the UI (for example, to create a new instance of the data object). When the user navigates to a field on the UI, the rules for the field are evaluated, which define a value of the field depending on values of other fields already added:

A) If no value has yet been entered into the field:
   1) If no rule is found, the field is left empty.
   2) If only one rule is found, the value is entered into the field as specified by the rule as a recommendation.
   3) If several rules are found, the rule with the highest rank is used; 4) the user can decide to keep the recommended value or change the value.
   5) If the user changes the value, scenario B) also applies.

B) There is a value already entered for the field:
   1) If no rule is found, the field value is unmodified.
   2) If only one matching rule is found, the value is checked against the rule.
      a) If the rule constraint is met, the value is kept, and no notification is sent to the user. Optionally, the user is notified about the fact, that existing constraints are met (the color of the field used to show the value is changed to "green");
      b) If the rule constraint is not met, the user is notified with a dialog, about recommendations:
         i) The violated constraint is explained to give the user the context understanding, why the dialog occurs.
         ii) The user is presented three options to choose from:
            (a) Adjust the value to a value specified by the rule. In case it is a numeric value, suggest the lower limit value, if the entered value is below the range, suggest the upper limit value, if the entered value is above the range.
            (b) Keep the entered value "as an exception", do not apply or modify the rule.
            (c) Add a new rule or change a rule (for example, in case of a value range).
         iii) A rule modification for a value range is recommended, or a rule is recommended based on the entered values. Users can confirm to use these or modify them before activation.
         iv) Optionally, the approach can check, that value ranges are not modified arbitrarily to non-applicable or obviously out-of-bound values (for example, allowing only changes within +/−10% or similar checks).
   3) If several rules are found, the rule with the highest rank is used.

4) If the user adds a rule, the rule is entered with a low rank to the approach and can be applied in a future call to the UI.
5) If a user modifies a rule, the modified rule is stored.
6) Optionally, a rule approval process can be added, where the newly proposed rule is presented to another person (for example, in a workflow sent to a domain expert) for approval or rejection.

With respect to rule ranking, in some implementations, the "confidence" and "support" mechanisms are used. Other ranking mechanisms are also possible and are considered to be within the scope if the disclosure in as much as they are consistent with the described concepts (for example, ranking approaches based on "interestingness" or "value").

In some implementations, rule ranking can be derived from a "confidence" value multiplied with a "support" value (where higher values=more important rule). The values can be computed based on data sets, and also for newly entered rules referring only to one pair of values (here, "confidence" would be 1 and "support" 1 divided by a number of data pairs (that is, rows in a database table)).

A newly defined rule is not based on a large number of records as those mined by ML. In a ranking, so it can have a lower priority ranking. However, a rule with a lower priority ranking can still be useful, as the rule can allow for validation if the same value is entered a following time and preventing unnecessary UI queries.

An example of a software application managing "Electronic Items" in a database table, Table 1 is now presented.

TABLE 1

| Product Name | Product Family | Product Group | Weight | Color |
| --- | --- | --- | --- | --- |
| Axil AirPlods | Headphones | Consumer Electronics | 50 g | white |
| Denox Amplifier | Home Theater | Consumer Electronics | 4.2 kg | black |
| Canor EOT | Digital Camera | Consumer Electronics | 700 g | black |
| Dylon X8 | Vacuum Cleaner | Home Appliances | 24 kg | |
| Glamsung WX4000 | Washing Machine | Home Appliances | 45 kg | white |
| Glamsung RX27 | Refrigerator | Home Appliances | 150 kg | silver |

As can be seen in Table 1, several attributes are specified per item (row). Example attributes include "Product Name," "Product Family" (a fine-grained categorization), "Product Group" (a coarser-grained categorization), and other attributes Weight and Color.

The short database table represented by Table 1 is for understanding only. Typically, for a ML algorithm to mine a rule from data, many rows (records) with similar relations would be required (for example, 1000 rows regarding "Headphones" and "Consumer Electronics," 900 rows regarding "Digital Camera" and "Consumer Electronics," and 100 rows regarding "Vacuum Cleaner" and "Home Appliance." In an actual database, Table 1 would likely have many rows (records) with similar relations between Product Family, Product Group, Weight, and Color.

Values in the example fields are not necessarily maintained and empty fields are also allowed. In this example, it is assumed that the data in the database table is of sufficient volume and correlation between values is sufficiently high for a ML rule-mining process to identify the rules specified in the diagrams. While ML may not typically be able to determine a rule from a single row, in the described approach a rule can be entered by a user and reflect a single row.

Example auto-fill/populate cases would be illustrative of the described concepts and aid in understanding.

In a first auto-fill/populate example, a rule exists to derive Product Group from a given Product Family. This rule is used to auto-fill/populate the value for Product Group, when a value for Product Family is entered. Specific examples can include: 1) User enters Product Family=Home Theater and the described approach sets Product Group=Consumer Electronics; 2) User enters Product Family=Headphones and the described approach sets Color to most probable value: black. User can confirm by advancing to next field or change to other value: white. This value is then validated against rules; 3) User enters Product Family=Freezer but there is no rule for Product Group and no most probable value. Therefore, user also enters Product Group=Home Appliance. The described approach shows a message, offering to change/reenter value, accept value as an exception or create a new rule for Product Family=Freezer.

In a second auto-fill/populate example, no rule exists for an entered value of Product Family, but when applying a fuzzy search on the entered Product Family value, a similar value is found and for this value a rule is found to derive Product Group. With a fuzzy search, the value for Product Family is corrected and Product Group is auto-filled/populated. If the user changes the proposed Product Group, the change to Product Family is also reverted, as the system understands that the fuzzy search resulted in a wrong proposal. Specific examples can include: 1) User enters Product Family=Hometheater [sic] and the described approach sets Product Family=Home Theater, Product Group=Consumer Electronics; 2) User enters Product Family=Home Decor and the described approach sets Product Family=Home Theater, Product Group=Consumer Electronics. However, the user changes Product Group to Home Accessories, so Product Family is reverted to Home Decor (in the example this happens whenever user does anything else but performing a confirming action).

Example validation cases would also be illustrative of the described concepts and aid in understanding.

In a first validation example, a set of rules exist that define allowed Colors for a given Product Family. Using this rule, the value for Color is validated, and if no matching rule is found, the user is informed by a message offering to: 1) fix value if valid rule can be found by applying fuzzy search; 2) accept value as an exception; or 3) create a new rule. Specific examples can include: 1) User enters Product Family=Washing Machine and Color=wite [sic] and the described approach fixes misspelled Color white, based on a rule found by fuzzy search and 2) User enters Product Family=Washing Machine and Color=silver and the described approach shows a message offering to change/reenter value, accept value as an exception, or create a new rule for Product Family=Washing Machine.

Figure 1:
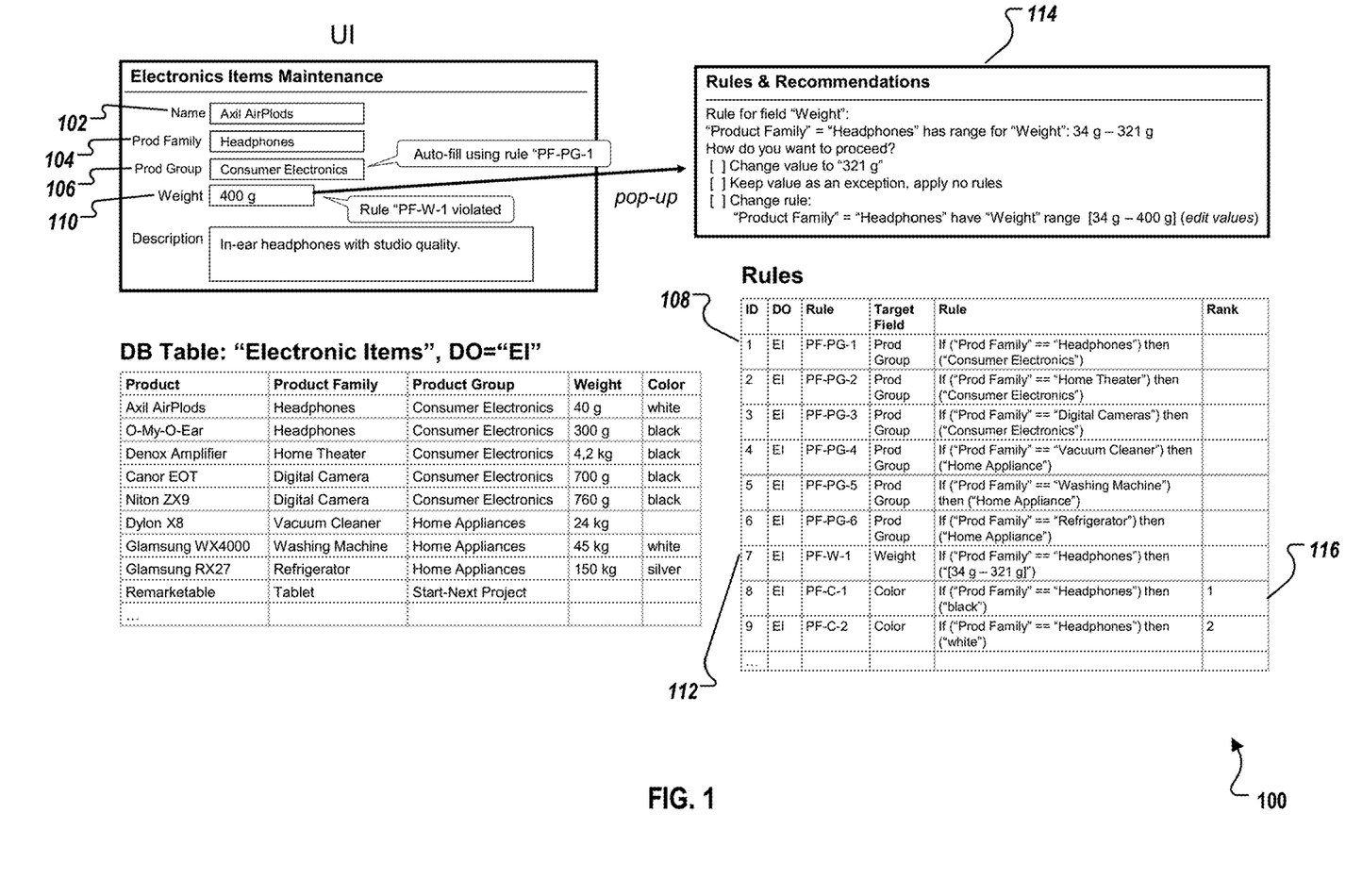
FIG. 1 is a block diagram illustrating an example validation range check, according to an implementation of the present disclosure.

As a second validation example, FIG. 1 is a block diagram 100 illustrating an example validation range check, according to an implementation of the present disclosure. In this validation example, a rule exists that defines a valid value range for Weight based on Product Family. Using this rule, the value for Weight is validated and if it is outside of the defined value range, the user is informed by a message offering to: 1) change the value manually; 2) accept value as exception; or 3) extend value range (that is, modify rule).

Referring to FIG. 1, a user enters details at 102 for Product Axil AirPlods and in Product Family 104 as Headphones. The Prod Group 106 is auto-filled/populated using rule PF-PG-1 108 to Consumer Electronics. The user incorrectly specifies a value in Weight 110=400 g instead of 40 g. This scenario could be due to a simple typographical error or the user is incorrectly equating Product Axil AirPlods with a different product (which could be relatively larger/heavier). The entered 400 g value deviates from the rule-defined range specified by rule PF-W-1 112.

The described approach generates a pop-up a dialog 114 and warns the user that the typical Weight range of Headphones is up to 321 g. Options presented to the user in the pop-up dialog 114 includes: 1) adjust the value; 2) accept the value as an exception (apply no rules); or 3) extend the value range from 321 g to up to 400 g. The user could also change the value in Weight 110 to 40 g to correct the issue.

As a third validation example, FIG. 2 is a block diagram 200 illustrating an example validation range check using multiple input fields, according to an implementation of the present disclosure. In this validation example, a rule for exists that defines a valid value for insurance based on Prod Family and Price values. Using this rule, the value for Insurance is validated and if it is outside of the defined value range, the user is informed by a message offering to: 1) change the value; 2) accept the value as an exception; or 3) modify the rule to fit the existing data.

Referring to FIG. 2, a user enters details at 202 for Product Axil AirPlods and in Product Family 204 as Headphones. The Prod Group 206 is auto-filled/populated using rule H-CR 208 to Cons. Electr. The user specifies a Price 210 of 98.95 €. Insurance 212 has a value of Yes entered. This scenario deviates from the rule-defined insurance value specified by rule Insurance 1 214 (If ("Prod Family"=="Headphones") {if "Price<99.96 €") then ("No") else ("Yes")}).

The described approach generates a pop-up a dialog 216 and warns the user that for the data entered (that is, price 99.95 €), the Insurance 212 value should be No. Options presented to the user in the pop-up dialog 216 includes: 1) change the value; 2) accept the value as an exception (apply no rules); or 3) change the existing rule. The user could also change the value in Insurance 212 to No to correct the issue.

Figure 3:
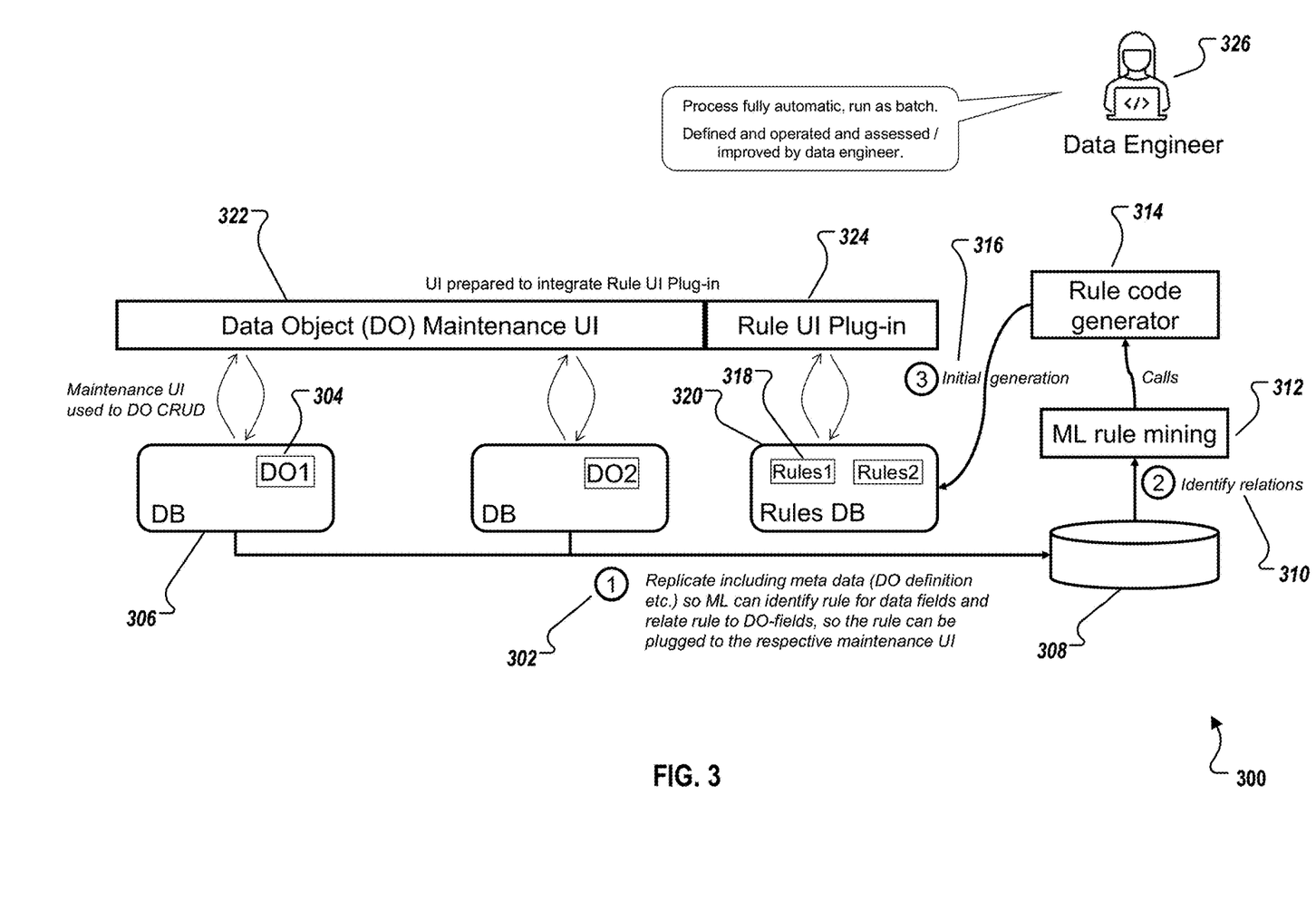
FIG. 3 is a block diagram illustrating components and a method for mining rules and embedding the rules into a user interface, according to an implementation of the present disclosure.

FIG. 3 is a block diagram illustrating components and a method 300 for mining rules and embedding the rules into a UI, according to an implementation of the present disclosure.

ML rule mining acts upon a data set, analyzes the data set and determines associated rules. In some implementations, the data set can be a single database of an application or a set of databases of a microservices-based application with distributed storage.

Determined rules can also be ranked, using one or more ranking mechanisms known to those of ordinary skill in the art. In some implementation, a ranking mechanism of choice can be indicated (for example, using a UI) for ranking purposes.

Referring to FIG. 3, at 302(1), data for a data object (DO) 304 in a database (DB) 306 is replicated into a data storage 308. From 302(1), method 300 proceeds to 310(2).

At 310(2), ML 310 is used to analyze the data in data storage 306 to identify a relation(s) for data fields. ML 312 calls a rule code generator 314 to relate the relation(s) and to generate one or more rules for DO data fields. From 310(2), method 300 proceeds to 316(3).

At 316(3), the rule code generator 314 generates rule(s) 318 in a rules database 320 to permit the rule(s) 318 to be plugged into a respective DO maintenance UI 322 using a rule UI plug-in 324, which the DO maintenance UI 322 has been extended to support. Note that an initial generation of rules 318 would occur the first time that the described approach is used. In some implementations, the rule code generator 314 is configured with an application programming interface (API), which can be called to generate rule code in a language supported by the UI (for example, JavaScript). In some implementations, the rule code generator 314 can be configured for a rule engine in either a backend computing environment (for example, rule evaluation takes place on an application server) or with the UI (for example, rule evaluation is running within the browser).

The DO maintenance UI 322 and related databases storing the DO instances (for example, DO1 304 and database 306) are extended to support the described approach. The DO maintenance UI 322 is rendered from DO metadata (plus additional layout and style information). In some implementations, the DO metadata can include DO-type, field names, field data types (including length), and input validation checks. The DO maintenance UI also includes a configurable input validation, which is configured to read rules from the rule UI plug-in 324 (for example, using DO type and field name).

The rule UI plug in 324 with rules DB 320 permits storage of rule code or rule configuration (for example, rule(s) 318). Each rule 318 is attributed with a DO type and field name(s), so that the DO maintenance UI 322 can call the rule UI plug-in 324 to obtain rules related to a certain field. If several rules 318 are available, they are sorted by rank (for example, refer to FIG. 1, 116) and the rank information can be provided with a list of rules 318.

In some implementations, the rule UI plug-in 324 can provide a configuration for a UI message to be shown in an additional UI (for example, in/as pop-up of the DO maintenance UI 322—such as, 114 in FIGS. 1 and 216 in FIG. 2) for review by a data engineer 326. In some implementations and as illustrated in FIGS. 1 and 2, the DO maintenance UI 322 can provide text explaining the rule and radio buttons with mutually exclusive options. In general, the mutually exclusive options permit: 1) adjustment of a value to a recommended value; 2) preserve an existing value/do not add or modify a rule; or 3) create a new rule/modify the existing rule. In some implementations, the DO maintenance UI 322 can display a new version of a rule, potentially with one or more editable fields for a user (data engineer 326) to modify one or more values of the rule (for example, refer to FIG. 2, 218).

In some implementations, the UI plug-in 324 can be used to store a newly defined rule. The UI plug-in 324 can annotate the newly defined rule with DO type and field name and store the rule in the rules database 320. In some implementations, the UI Plug-in 324 can be used to edit existing rules.

Figure 4:
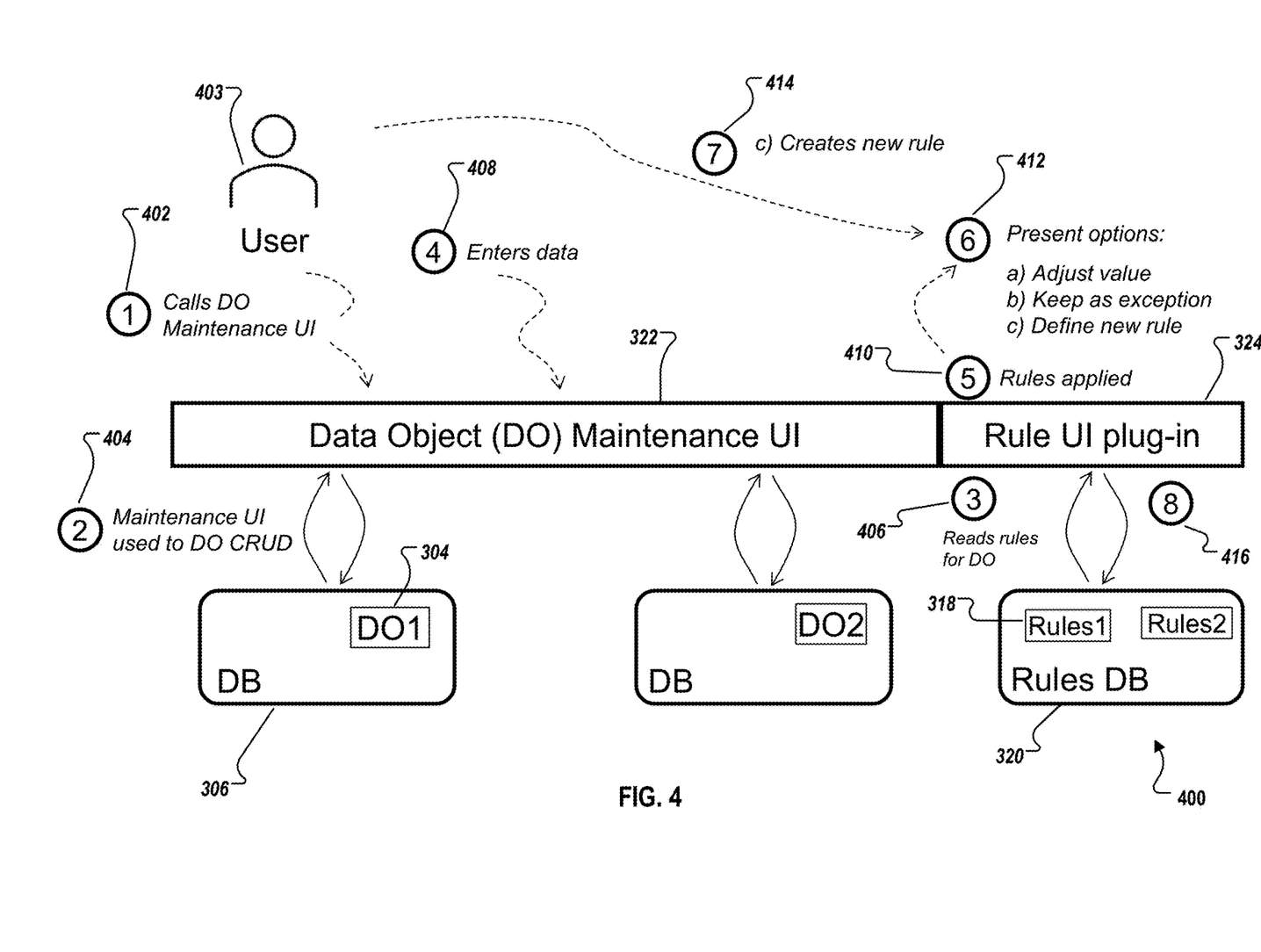
FIG. 4 is a block diagram illustrating components and a method for executing and extending rules, according to an implementation of the present disclosure.

FIG. 4 is a block diagram illustrating components and a method 400 for executing and extending rules, according to an implementation of the present disclosure.

At 402(1), a user 403 (for example, a user of the application that maintains data for an electronic items store) requests access to a DO maintenance UI 322 for a selected data object (for example DO1 304 stored database 306) to enter new data. From 402(1), method 400 proceeds to 404(2).

At 404(2), the DO definition and associated UI attributes are read and the DO maintenance UI 322 is displayed for user 403 access. From 404(2), method 400 proceeds to 406(3).

At 406(3), the rules for the respective DO are read by the rule UI plug-in 324 and related to fields on the DO maintenance UI 322 so that the rules can be used to auto-fill/populate applicable values in the DO maintenance UI 322 and to validate values. From 406(3), method 400 proceeds to 408(4).

At 408(4), the user 403 enters data using the DO maintenance UI 322. From 408(4), method 400 proceeds to 410(5).

At 410(5), following data entry using the DO maintenance UI 322, the DO maintenance UI 322 applies the rules for the respective DO. From 410(5), method 400 proceeds to 412(6).

At 412(6), if the rules for the respective DO are violated, the DO maintenance UI 322 displays an additional UI (for example, in the DO maintenance UI 322 or as a separate pop-up dialog) with a message with mutually exclusive options for the user 403 to select from. In some implementations, the mutually exclusive options include one or more of: 1) adjust a value to a value recommended by the rule; 2) keep the value as entered, do not apply rule; 3) define a new rule. In some implementations, a ranked list of recommended rules can optionally be presented in the additional UI. In some implementations, the recommended rules can include pre-set values or adjustable range limits in case of numeric values. From 412(6), method 400 proceeds to 414(7).

At 414(7), the user 403 selects option 3) from 412(6) to define and add a new rule. From 414(7) method 400 proceeds to 416(8).

At 416(8), the new rule is stored in the rules database 320. The new rule includes attributes specifying the associated DO type and field name(s). After 416(8), method 400 stops.

Figure 5:
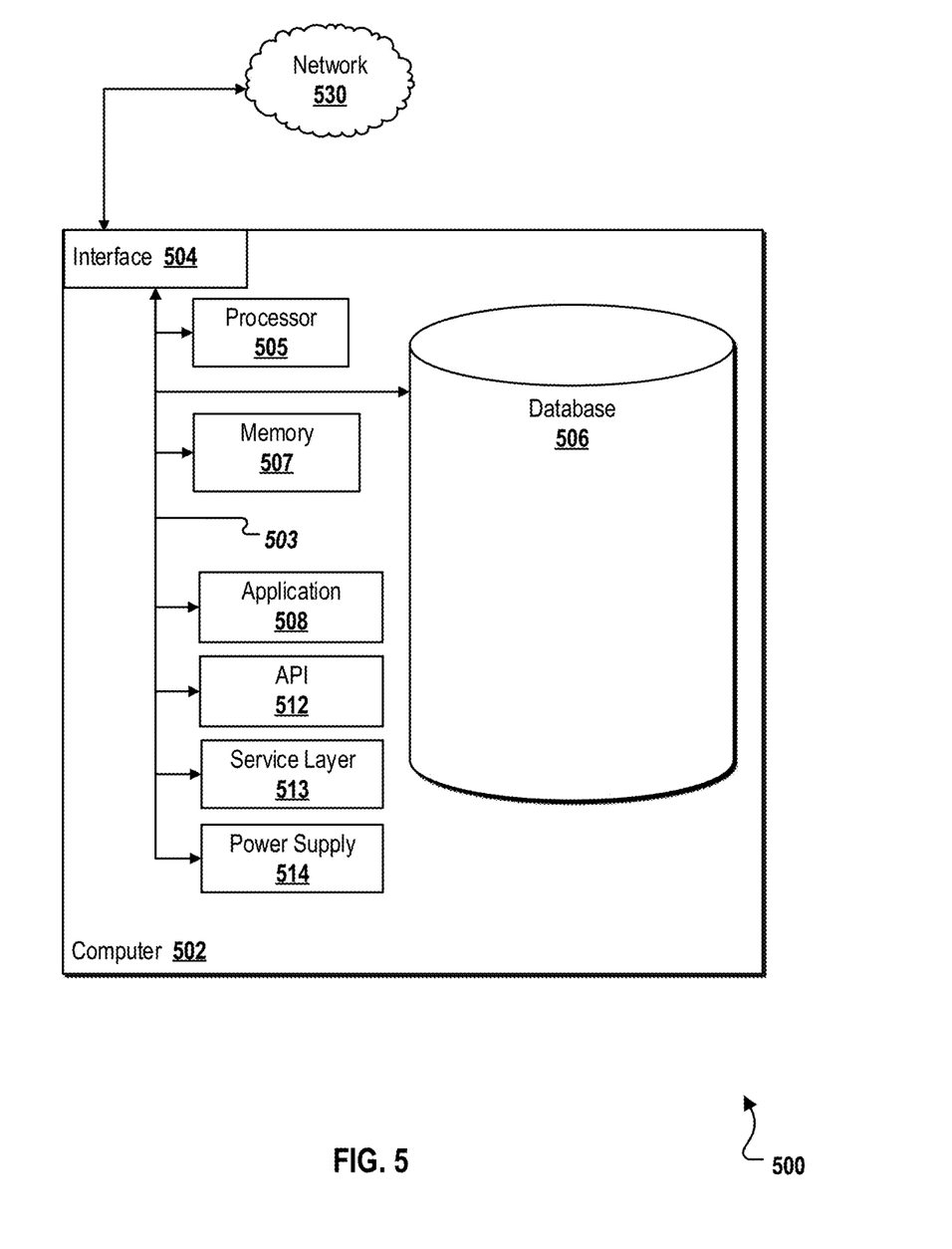
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 502 can include an input device, such as a keypad, keyboard, or touch screen, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as, for example, a client, network component, a server, or a database or another persistency, or a combination of roles for performing the subject matter described in the present disclosure. The illustrated Computer 502 is communicably coupled with a Network 530. In some implementations, one or more components of the Computer 502 can be configured to operate within an environment, or a combination of environments, including cloud-computing, local, or global.

At a high level, the Computer 502 is an electronic computing device operable to receive, transmit, process, store, or manage data and information associated with the described subject matter. According to some implementations, the Computer 502 can also include or be communicably coupled with a server, such as an application server, e-mail server, web server, caching server, or streaming data server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory or conventional database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502. As illustrated, the Database 506 can hold the previously described data objects, rules, and other data applicable to the described approach.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method, comprises: reading, by a rule user interface (UI) plug-in associated with a data object (DO) maintenance UI, one or more rules associated with a DO from a rules database; relating, by the rule UI plug-in, the one or more rules for the DO to fields associated with the DO on the DO maintenance UI; auto-populating and validating, by the rule UI plug-in and using the related one or more rules, received values for the fields associated with the DO on the DO maintenance UI; determining, by the rule UI plug-in, that one or more violations of the one or more rules has occurred; display, by the rule UI plug-in, an additional UI with mutually exclusive options for mitigating the determined one or more violations of the one or more rules; and saving a new rule into the rules database.

The foregoing and other described implementations can each, optionally, include one or more of the following features:

A first feature, combinable with any of the following features, comprising receiving a request for access to the DO maintenance UI with respect to the DO.

A second feature, combinable with any of the previous or following features, comprising receiving, by the DO maintenance UI, values for the fields associated with the DO on the DO maintenance UI.

A third feature, combinable with any of the previous or following features, wherein the mutually exclusive options include one or more of: 1) adjusting a value to a value recommended by a rule; 2) keeping the value as entered, do not apply the rule; or 3) define a new rule.

A fourth feature, combinable with any of the previous or following features, comprising: selecting the mutually exclusive option to 3) define a new rule; and defining the new rule.

A fifth feature, combinable with any of the previous or following features, wherein the new rule includes attributes specifying an associated DO type and field name(s).

A sixth feature, combinable with any of the previous or following features, wherein the additional UI includes a ranked list of recommended rules.

In a second implementation, a non-transitory, computer-readable medium storing one or more instructions executable by a computer system to perform operations comprising: reading, by a rule user interface (UI) plug-in associated with a data object (DO) maintenance UI, one or more rules associated with a DO from a rules database; relating, by the rule UI plug-in, the one or more rules for the DO to fields associated with the DO on the DO maintenance UI; auto-populating and validating, by the rule UI plug-in and using the related one or more rules, received values for the fields associated with the DO on the DO maintenance UI; determining, by the rule UI plug-in, that one or more violations of the one or more rules has occurred; display, by the rule UI plug-in, an additional UI with mutually exclusive options for mitigating the determined one or more violations of the one or more rules; and saving a new rule into the rules database.

The foregoing and other described implementations can each, optionally, include one or more of the following features:

A first feature, combinable with any of the following features, comprising receiving a request for access to the DO maintenance UI with respect to the DO.

A second feature, combinable with any of the previous or following features, comprising receiving, by the DO maintenance UI, values for the fields associated with the DO on the DO maintenance UI.

A third feature, combinable with any of the previous or following features, wherein the mutually exclusive options include one or more of: 1) adjusting a value to a value recommended by a rule; 2) keeping the value as entered, do not apply the rule; or 3) define a new rule.

A fourth feature, combinable with any of the previous or following features, comprising: selecting the mutually exclusive option to 3) define a new rule; and defining the new rule.

A fifth feature, combinable with any of the previous or following features, wherein the new rule includes attributes specifying an associated DO type and field name(s).

A sixth feature, combinable with any of the previous or following features, wherein the additional UI includes a ranked list of recommended rules.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: reading, by a rule user interface (UI) plug-in associated with a data object (DO) maintenance UI, one or more rules associated with a DO from a rules database; relating, by the rule UI plug-in, the one or more rules for the DO to fields associated with the DO on the DO maintenance UI; auto-populating and validating, by the rule UI plug-in and using the related one or more rules, received values for the fields associated with the DO on the DO maintenance UI; determining, by the rule UI plug-in, that one or more violations of the one or more rules has occurred; display, by the rule UI plug-in, an additional UI with mutually exclusive options for mitigating the determined one or more violations of the one or more rules; and saving a new rule into the rules database.

The foregoing and other described implementations can each, optionally, include one or more of the following features:

A first feature, combinable with any of the following features, comprising receiving a request for access to the DO maintenance UI with respect to the DO.

A second feature, combinable with any of the previous or following features, comprising receiving, by the DO maintenance UI, values for the fields associated with the DO on the DO maintenance UI.

A third feature, combinable with any of the previous or following features, wherein the mutually exclusive options include one or more of: 1) adjusting a value to a value recommended by a rule; 2) keeping the value as entered, do not apply the rule; or 3) define a new rule.

A fourth feature, combinable with any of the previous or following features, comprising: selecting the mutually exclusive option to 3) define a new rule; and defining the new rule.

A fifth feature, combinable with any of the previous or following features, wherein the new rule includes attributes specifying an associated DO type and field name(s).

A sixth feature, combinable with any of the previous or following features, wherein the additional UI includes a ranked list of recommended rules.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   reading, by a rule user interface (UI) plug-in associated with a data object (DO) maintenance UI, one or more rules associated with a DO from a rules database;
   relating, by the rule UI plug-in, the one or more rules for the DO to fields associated with the DO on the DO maintenance UI;
   auto-populating and validating, by the rule UI plug-in and using the related one or more rules, received values for the fields associated with the DO on the DO maintenance UI;
   determining, by the rule UI plug-in, that one or more violations of the one or more rules has occurred;
   displaying display, by the rule UI plug-in, an additional UI with mutually exclusive options for mitigating the determined one or more violations of the one or more rules; and saving a defined new rule into the rules database.

2. The computer-implemented method of claim 1, comprising receiving a request for access to the DO maintenance UI with respect to the DO.

3. The computer-implemented method of claim 1, comprising receiving, by the DO maintenance UI, values for the fields associated with the DO on the DO maintenance UI.

4. The computer-implemented method of claim 1, wherein the mutually exclusive options include one or more of: 1) an adjustment to a value recommended by a rule option; 2) keeping the value as entered and do not apply the rule option; or 3) define a new rule definition option.

5. The computer-implemented method of claim 4, comprising:
   selecting the mutually exclusive option 3); and
   defining a new rule.

6. The computer-implemented method of claim 1, wherein the new rule includes attributes specifying an associated DO type and field name(s).

7. The computer-implemented method of claim 1, wherein the additional UI includes a ranked list of recommended rules.

8. A non-transitory, computer-readable medium storing one or more instructions executable by a computer system to perform operations comprising:
   reading, by a rule user interface (UI) plug-in associated with a data object (DO) maintenance UI, one or more rules associated with a DO from a rules database;
   relating, by the rule UI plug-in, the one or more rules for the DO to fields associated with the DO on the DO maintenance UI;
   auto-populating and validating, by the rule UI plug-in and using the related one or more rules, received values for the fields associated with the DO on the DO maintenance UI;
   determining, by the rule UI plug-in, that one or more violations of the one or more rules has occurred;
   display, by the rule UI plug-in, an additional UI with mutually exclusive options for mitigating the determined one or more violations of the one or more rules; and
   saving a defined new rule into the rules database.

9. The non-transitory, computer-readable medium of claim 8, comprising receiving a request for access to the DO maintenance UI with respect to the DO.

10. The non-transitory, computer-readable medium of claim 8, comprising receiving, by the DO maintenance UI, values for the fields associated with the DO on the DO maintenance UI.

11. The non-transitory, computer-readable medium of claim 8, wherein the mutually exclusive options include one or more of: 1) an adjustment to a value recommended by a rule option; 2) keeping the value as entered and do not apply the rule option; or 3) define a new rule definition option.

12. The non-transitory, computer-readable medium of claim 11, comprising:
    selecting the mutually exclusive option 3); and
    defining a new rule definition option.

13. The non-transitory, computer-readable medium of claim 8, wherein the new rule includes attributes specifying an associated DO type and field name(s).

14. The non-transitory, computer-readable medium of claim 8, wherein the additional UI includes a ranked list of recommended rules.

15. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    reading, by a rule user interface (UI) plug-in associated with a data object (DO) maintenance UI, one or more rules associated with a DO from a rules database;
    relating, by the rule UI plug-in, the one or more rules for the DO to fields associated with the DO on the DO maintenance UI;
    auto-populating and validating, by the rule UI plug-in and using the related one or more rules, received values for the fields associated with the DO on the DO maintenance UI;
    determining, by the rule UI plug-in, that one or more violations of the one or more rules has occurred;
    display, by the rule UI plug-in, an additional UI with mutually exclusive options for mitigating the determined one or more violations of the one or more rules; and
    saving a defined new rule into the rules database.

16. The computer-implemented system of claim 15, comprising receiving a request for access to the DO maintenance UI with respect to the DO.

17. The computer-implemented system of claim 15, comprising receiving, by the DO maintenance UI, values for the fields associated with the DO on the DO maintenance UI.

18. The computer-implemented system of claim 15, wherein the mutually exclusive options include one or more of: 1) an adjustment to a value recommended by a rule option; 2) keeping the value as entered and do not apply the rule option; or 3) a new rule definition option.

19. The computer-implemented system of claim 15, wherein the new rule includes attributes specifying an associated DO type and field name(s).

20. The computer-implemented system of claim 15, wherein the additional UI includes a ranked list of recommended rules.

* * * * *